(12) United States Patent
Kerschner

(10) Patent No.: US 6,639,203 B1
(45) Date of Patent: Oct. 28, 2003

(54) CATADIOPTRIC LENS SYSTEM FOR A SCANNING DEVICE

(75) Inventor: Ronald K Kerschner, Loveland, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 08/888,339

(22) Filed: Jul. 2, 1997

(51) Int. Cl.[7] .................................................. H01J 3/14
(52) U.S. Cl. ..................................... 250/216; 250/208.1
(58) Field of Search ................................. 250/234, 216, 250/208.1; 359/731–733, 727, 364–366, 631

(56) References Cited

U.S. PATENT DOCUMENTS

| | | | |
|---|---|---|---|
| 4,003,642 A | * 1/1977 | Vogeley | 250/208.2 |
| 4,106,855 A | * 8/1978 | Coon | 359/731 |
| 4,703,186 A | 10/1987 | Nakayama et al. | 250/566 |
| 4,709,144 A | 11/1987 | Vincent | 250/226 |
| 4,819,083 A | 4/1989 | Kawai et al. | 358/294 |
| 4,870,268 A | 9/1989 | Vincent et al. | 250/226 |
| 4,894,523 A | 1/1990 | Chadima, Jr. et al. | 235/472 |
| 4,899,228 A | 2/1990 | Sano et al. | 358/473 |
| 4,926,041 A | 5/1990 | Boyd | 250/226 |
| 4,967,188 A | 10/1990 | Collins, Jr. | 340/636 |
| 4,969,054 A | 11/1990 | Tsuji et al. | 358/473 |
| 5,019,703 A | 5/1991 | Boyd et al. | 250/208.1 |
| 5,032,004 A | 7/1991 | Steinle | 350/171 |
| 5,038,028 A | 8/1991 | Boyd et al. | 250/208.1 |
| 5,040,872 A | 8/1991 | Steinle | 359/638 |
| 5,044,727 A | 9/1991 | Steinle | 350/171 |
| 5,089,910 A | * 2/1992 | Sigler | 359/366 |
| 5,182,450 A | 1/1993 | Pan | 250/234 |
| 5,227,620 A | 7/1993 | Elder, Jr. et al. | 250/208 |
| 5,301,243 A | 4/1994 | Olschafskie et al. | 382/59 |
| 5,306,908 A | 4/1994 | McConica et al. | 250/234 |
| 5,381,020 A | 1/1995 | Kochis et al. | 250/566 |
| 5,410,347 A | 4/1995 | Steinle et al. | 348/270 |
| 5,434,680 A | 7/1995 | Noda et al. | 358/471 |
| 5,552,597 A | 9/1996 | McConica | 250/234 |
| 5,586,212 A | 12/1996 | McConica et al. | 385/146 |
| 5,793,538 A | * 8/1998 | Cameron et al. | 359/731 |

FOREIGN PATENT DOCUMENTS

| | | |
|---|---|---|
| EP | 0168256 | 1/1986 |
| EP | 270686 | 6/1988 |
| JP | 63042275 | 7/1988 |
| JP | 4319857 | 3/1993 |
| WO | WO8801123 | 2/1988 |

OTHER PUBLICATIONS

Optical and Electro–Optical Engineering Series "Modern Optical Engineering" the Design of Optical Systems, Warren J. Smith, Chapter Thirteen, pp. 436–453, copyright 1990 by McGraw–Hill, Inc. (No Month provided).

* cited by examiner

Primary Examiner—Que T. Le

(57) ABSTRACT

The present invention is directed to an optical system for a scanning device. The optical system employs a catadioptric lens which both refracts and reflects the light passing through it. In this manner, the majority of the image path portion of the light beam may be folded within the lens. This enables the required optical path length to be achieved while providing a smaller, more compact physical envelope for the imaging assembly. The catadioptric lens achieves focusing of the light beam through the use of mirrored surfaces on the lens. Several refractive surfaces are also provided to correct for various aberrations, such as, for example, spherical aberration.

26 Claims, 7 Drawing Sheets

CATADIOPTRIC LENS SYSTEM FOR A SCANNING DEVICE

FIELD OF THE INVENTION

The present invention relates generally to optical scanning devices and, more particularly, to a catadioptric lens system for an optical scanning device.

BACKGROUND OF THE INVENTION

Optical scanning devices are well-known in the art and produce machine-readable data which is representative of the image of an object, e.g., a page of printed text. Optical scanning devices generally employ line-focus systems which image an object by sequentially focusing narrow "scan line" portions of the object onto a linear photosensor array by sweeping a scanning head over the object.

In a line-focus system, a light beam from an illuminated line object is imaged by a lens on a linear photosensor array which is positioned remotely from the line object. The linear photosensor array is a single dimension array of photoelements which correspond to small area locations on the line object. These small area locations on the line object are commonly referred to as "picture elements" or "pixels." In response to light from its corresponding pixel location on the line object, each photosensor pixel element in the linear photosensor array (sometimes referred to simply as a "pixel") produces a data signal which is representative of the light intensity that it experiences during an immediately preceding interval of time known as a sampling interval. All of the photoelement data signals are received and processed by an appropriate data processing system.

In a color optical scanning device, a plurality of spectrally separated imaging beams (typically red, green and blue beams) must be projected onto photosensor arrays. Some color optical scanning devices employ beam splitter devices for spectrally separating an imaging light beam into color component beams. These separate color component beams are projected onto separate linear photosensor arrays. Other optical scanning devices project color component images on a single linear array in a series of separate scanning passes.

The construction and operation of color optical scanning devices employing beam splitter assemblies and photosensor arrays are disclosed in the following United States Patents: U.S. Pat. No. 5,410,347 of Steinle et al. for COLOR OPTICAL SCANNER WITH IMAGE REGISTRATION HOLDING ASSEMBLY; U.S. Pat. No. 4,870,268 of Vincent et al. for COLOR COMBINER AND SEPARATOR AND IMPLEMENTATIONS; U.S. Pat. No. 4,926,041 of Boyd for OPTICAL SCANNER (and corresponding EPO patent application no. 90306876.5 filed Jun. 22, 1990); U.S. Pat. No. 5,019,703 of Boyd et al. for OPTICAL SCANNER WITH MIRROR MOUNTED OCCLUDING APERTURE OR FILTER (and corresponding EPO patent application no. 90312893.2 filed Nov. 27, 1990); U.S. Pat. No. 5,032,004 of Steinle for BEAM SPLITTER APPARATUS WITH ADJUSTABLE IMAGE FOCUS AND REGISTRATION (and corresponding EPO patent application no. 91304185.1 filed May 9, 1991); U.S. Pat. No. 5,044,727 of Steinle for BEAM SPLITTER/COMBINER APPARATUS (and corresponding EPO patent application no. 91303860.3 filed Apr. 29, 1991); U.S. Pat. No. 5,040,872 of Steinle for BEAM SPLITTER/COMBINER WITH PATH LENGTH COMPENSATOR (and corresponding EPO patent application no. 90124279.2 filed Dec. 14, 1990 which has been abandoned); and U.S. Pat. No. 5,227,620 of Elder, Jr. et al. for APPARATUS FOR ASSEMBLING COMPONENTS OF COLOR OPTICAL SCANNERS (and corresponding EPO patent application no. 91304403.8 filed May 16, 1991), which are all hereby specifically incorporated by reference for all that is disclosed therein.

A hand-held optical scanning device is an optical scanner which is moved across a scanned object, e.g. a page of text, by hand. Rollers may be provided on a hand-held scanning device to guide the device across the object to be scanned and also to provide data to the scanning device microprocessor regarding the speed at which the scanning device is being moved over the scanned object. These rollers may also serve to control the speed at which an operator moves the scanning device across the scanned object.

The construction and operation of hand-held optical scanning devices employing such rollers is disclosed in United States patents: U.S. Pat. No. 5,381,020 of Kochis et al. for HAND-HELD OPTICAL SCANNER WITH ONBOARD BATTERY RECHARGING ASSEMBLY and U.S. Pat. No. 5,306,908 of McConica et al. for MANUALLY OPERATED HAND-HELD OPTICAL SCANNER WITH TACTILE SPEED CONTROL ASSEMBLY (and corresponding EPO patent application no. 94301507.3 filed Mar. 2, 1994), and in U.S. patent application Ser. No. 08/601,276 filed Jan. 29, 1996 of Kerschner et al. for HAND-HELD SCANNING DEVICE; U.S. patent application Ser. No. 08/592,904 filed Jan. 29, 1996 of Kerschner et al. for SCANNING DEVICE WITH NON-CONTACT OPTICAL COMPONENTS; U.S. patent application Ser. No. 08/878,110 filed Jun. 18, 1997, of Kerschner et. al. for SCANNING DEVICE WITH FLOATING WINDOW MEMBER; and U.S. patent application Ser. No. 08/878,429 filed Jun. 18, 1997, of Kerschner et al. for ILLUMINATION SYSTEM WITH WHITE LEVEL CALIBRATION FOR HAND-HELD SCANNER which are all hereby specifically incorporated by reference for all that is disclosed therein.

In a typical scanning device, a lens is generally provided which separates the light beam into an object path portion and an image path portion. The object path portion generally extends between the object being scanned and the lens while the image path portion generally extends between the lens and the photosensor array. In order to scan conventional size documents, most scanning devices have a length of at least about 8.5 inches. A typical linear photosensor array, however, may have a length of only about 1.21 inches. The imaging assembly of a scanning device, thus must be configured to reduce the scan line image to the size of the photosensor array, e.g., from about 8.5 inches to about 1.21 inches.

As is well known, the amount of image reduction caused by an imaging assembly is dictated by the relationship between the length of the object path and the length of the image path. Further, for a lens having a given focal length, the length of the object path and of the image path will be determined by the required image reduction. Accordingly, to achieve a given image reduction using a lens having a given focal length, the overall length of the imaging path must be a certain length. For example, if a lens having a focal length of 0.984 inches is used and an image reduction ratio of 7:1 is desired (as needed, e.g., to reduce a 8.5 inch long scan line to a 1.21 inch long photosensor array), then the length of the object path 50 must be about 7.87 inches and the length of the image path 52 must be about 1.125 inches. Thus, the overall length of the imaging path must be the sum of the object path and the image path lengths, or 8.995 inches.

The relationships set forth above dictate the geometry and physical size of the optical assembly of a conventional optical scanning device. Specifically, the necessity to maintain a light path having a particular length serves to limit the minimum size of the optical assembly and reduces the degree of compactness achievable for the imaging assembly and, thus, for the overall optical scanning device.

It is noted that it is possible to shorten the light path of an optical scanning device by using a shorter focal length lens. A shorter focal length lens, however, requires a greater field of view than a longer focal length lens. This greater field of view, in turn, worsens the optical aberrations, e.g., spherical aberration, which are inherent in lenses. Accordingly, it is not generally desirable to shorten the light path of an optical scanning device by merely reducing the focal length of the lens.

Optical systems for hand-held scanning devices must generally be very compact due to the relatively small size of hand-held scanning devices. Generally, such optical systems include various mirrors, and prisms to fold the light path in order to achieve the necessary optical path length in the smallest physical package feasible. Even with the use of such mirrors and prisms, however, the compactness of optical scanning devices is limited by the optical requirements set forth above.

SUMMARY OF THE INVENTION

The present invention is directed to an optical system for a scanning device. The optical system employs a catadioptric lens which both refracts and reflects the light passing through it. In this manner, the majority of the image path portion of the light beam may be folded within the lens. This enables the required optical path length to be achieved while providing a smaller, more compact physical envelope for the imaging assembly.

The catadioptric lens achieves focusing of the light beam through the use of mirrored surfaces on the lens. Several refractive surfaces are also provided to correct for various aberrations, such as, for example, spherical aberration.

DETAILED DESCRIPTION OF THE INVENTION

Figure 1:
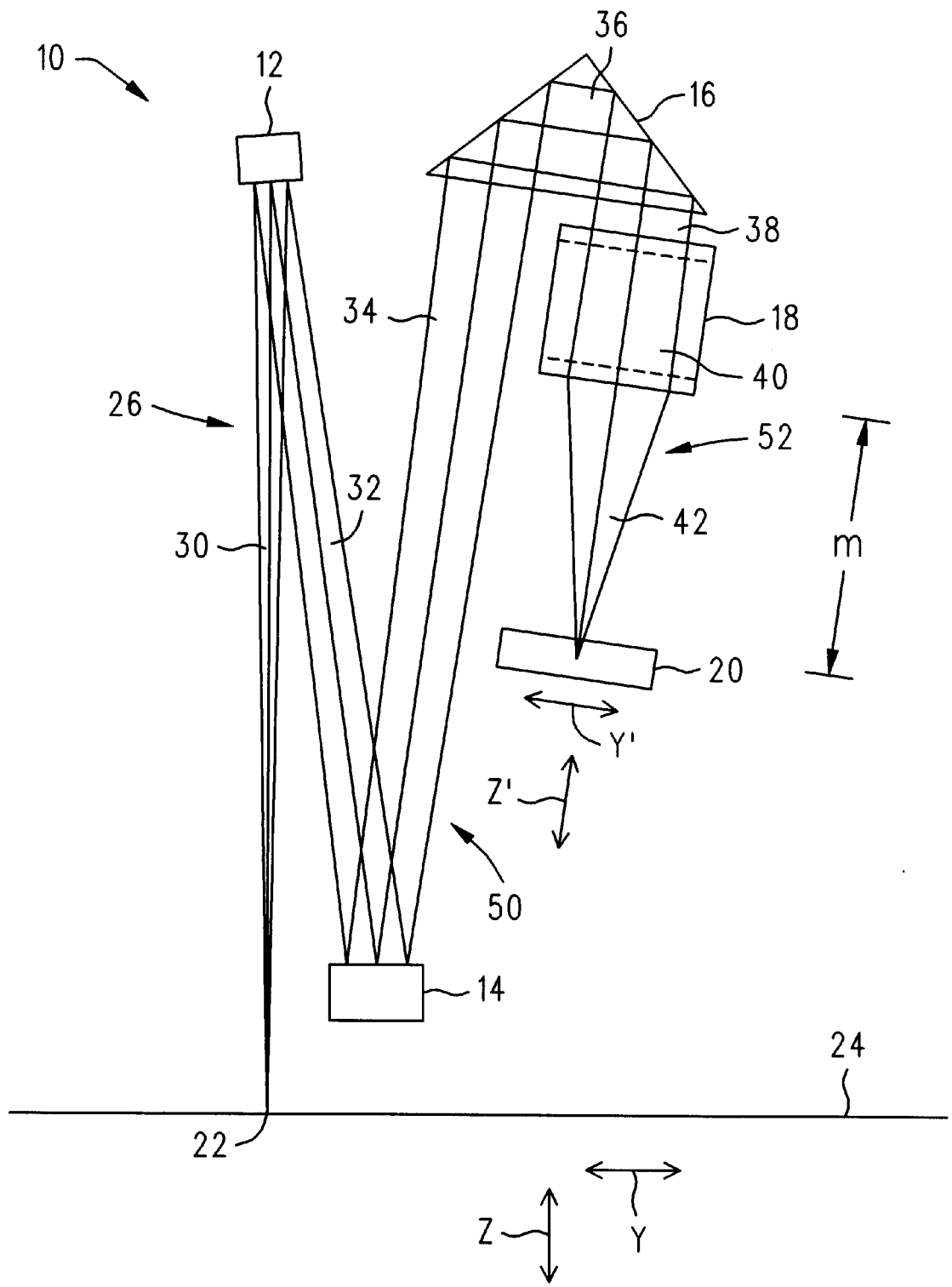
FIG. 1 is a schematic illustration of a conventional optical scanning device imaging assembly.

FIGS. 1–7, in general, illustrate an optical assembly 10 for a photoelectric imaging apparatus in which a light path 26 extends between an object 24 which is to be imaged and a photosensor array 20. The optical assembly 10 includes the photosensor array 20 and a plurality of optical components (12, 14, 100) arranged along the light path 26. The plurality of optical components include a catadioptric lens 100.

FIGS. 1–7 also illustrate, in general a method of imaging a portion 22 of an object 24 which is to be imaged onto a photosensor array 20 with a photoelectric imaging apparatus in which a light path 26 extends between the portion 22 of the object 24 and the photosensor array 20. The method includes the steps of providing an optical assembly 10 including the photosensor array 20 and a plurality of optical components 12, 14, 100 arranged along the light path 26, the optical components 12, 14, 100 including a lens 100; transmitting an imaging light beam 26 from the portion 22 of the object 24 to the photosensor array 20 along the light path 26 via the optical components 12, 14, 100; and reflecting the imaging light beam 26 within the lens 100.

Having thus described the photoelectric imaging apparatus optical assembly in general, the device will now be described in further detail.

FIG. 1 schematically illustrates an imaging assembly 10 of the type which might be used, for example, in a conventional hand-held optical scanning device. Imaging assembly 10 may contain first and second mirrors 12 and 14, respectively, a prism 16, and an imaging lens 18. These optical components fold and resize the imaging beam 26 and serve to focus an image of a line portion 22 of a scanned object 24 onto a photosensor array 20 in a manner that is well-known in the art.

Referring again to FIG. 1, the object 24 may generally be considered to lie within an object plane x-y wherein the y axis lies within the plane of FIG. 1 and the x axis extends in a perpendicular fashion with respect to the y axis and with respect to the plane of FIG. 1. A third axis z, as indicated in FIG. 1, extends in a direction perpendicular to both the axes x and y and lies within the plane of FIG. 1. In an example where the object 24 is a standard 8.5 by 11 inch page of text or graphics, the y axis would generally correspond to the 11 inch dimension of the page and the x axis would generally correspond to the 8.5 inch dimension of the page.

In a similar manner, the image focused on the photosensor array 20 may also be considered to lie within an image plane x'-y' wherein the y' axis lies within the plane of FIG. 1 and the x' axis extends in a perpendicular fashion with respect to the y' axis and with respect to the plane of FIG. 1. A third axis z', as indicated in FIG. 1, extends in a direction perpendicular to both the axes x' and y' and lies within the plane of FIG. 1.

Referring again to FIG. 1, it can be seen that, due to the configuration of the mirrors 12 and 14 and the prism 16, the image plane x'-y' will not necessarily be parallel to the object plane x-y. It is noted, for example, that the image axis y' is not parallel to the object axis y. From an optical perspective, however, the image plane x'-y' does correspond to the object plane x-y. In other words, the axes x, y and z in the object plane directly correspond to the axes x', y' and z', respectively, in the image plane.

The configuration of the mirrors 12 and 14, the prism 16 and the photosensor array 20 cause the imaging light beam 26 to be folded into a plurality of imaging beam portions. Specifically, a first imaging beam portion 30 may extend between the line portion 22 and the first mirror 12 and may have a length, for example, of about 3.2 inches. A second imaging beam portion 32 may extend between the first mirror 12 and the second mirror 14 and may have a length, for example, of about 2.3 inches. A third imaging beam portion 34 may extend between the second mirror 14 and the prism 16 and may have a length, for example, of about 2.14 inches. A fourth imaging beam portion 36 may extend within the prism 16 and may have a length, for example, of about 0.7 inches. A fifth imaging beam portion 38 may extend between the prism 16 and the lens 18 and may have a length, for example, of about 0.12 inches. A sixth imaging beam portion 40 may extend within the lens 18 and may have a length, for example, of about 0.38 inches. A seventh imaging beam portion 42 may extend between the lens 18 and the photosensor array 20 and may have a length, for example, of about 0.78 inches.

As is generally true in all image focusing systems, the imaging beam 26 comprises an object path portion 50 and an image path portion 52. Object path portion 50 generally extends between the object (i.e., the line portion 22) and the lens 18 and, thus, includes imaging beam portions 30, 32, 34, 36 and 38. Image path portion 52 generally extends between the lens 18 and the photosensor array 20 and, thus, is comprised of imaging beam portion 42.

During operation of a typical scanning device, the scanning device optical assembly 10 is moved relative to the object 24 in order to sequentially focus consecutive scan line portions of the object 24 onto the photosensor array 20 and thus acquire data representative of an image of the entire object 24. In order to have the ability to scan conventional size documents, most scanning devices have a length of at least about 8.5 inches. Accordingly, referring again to FIG. 1, the scan line portion 22 may have a length, measured in the x axis direction, of at least about 8.5 inches. A typical linear photosensor array 20, however, may have a length (measured in the x' axis direction) of only about 1.21 inches. The imaging assembly 10, thus must be configured to reduce the scan line image to the size of the photosensor array, e.g., from at least about 8.5 inches to about 1.21 inches.

As is well known, the amount of image reduction achieved by an imaging assembly, such as the imaging assembly 10, is dictated by the relationship between the length of the object path 50 and the length of the image path 52. Further, for a lens having a given focal length, the length of the object path 50 and of the image path 52 will be determined by the required image reduction. Accordingly, to achieve a given image reduction using a lens having a given focal length, the overall length of the imaging path 26 must be a fixed length. For example, if a lens having a focal length of 0.984 inches is used and an image reduction ratio of 7:1 is desired (as needed, e.g., to reduce a 8.5 inch long scan line to a 1.21 inch long photosensor array), then the length of the object path 50 must be about 7.87 inches and the length of the image path 52 must be about 1.125 inches. Thus, the overall length of the imaging path 26 must be the sum of the object path and the image path lengths, or about 8.995 inches.

The relationships set forth above dictate the geometry and physical size of the optical assembly 10 of a conventional optical scanning device. Specifically, the necessity to maintain the light path 26 having a particular length serves to limit the minimum size of the optical assembly 10 and reduces the degree of compactness achievable for the imaging assembly 10 and, thus, for the overall optical scanning device.

Figure 2:
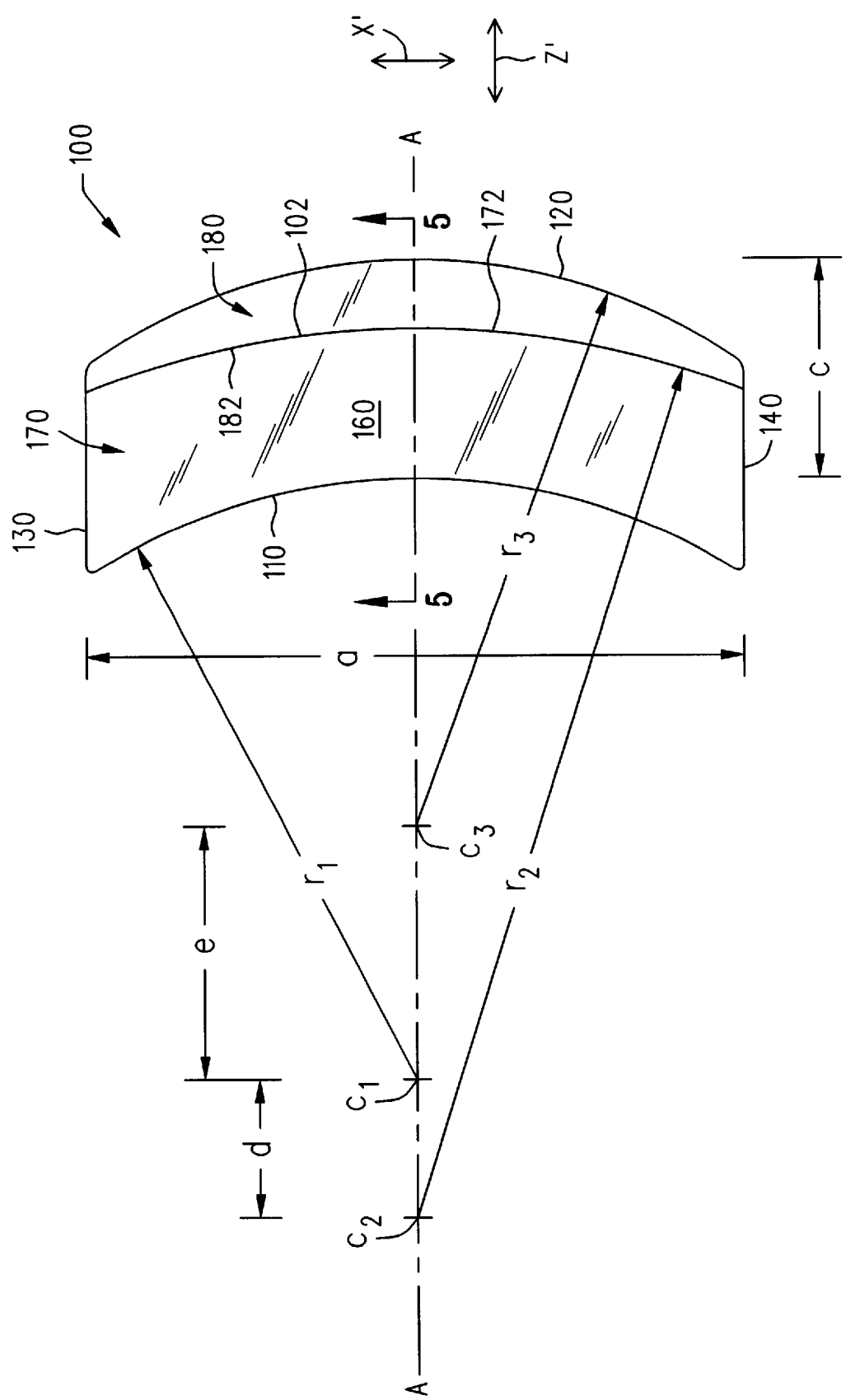
FIG. 2 is a side elevation view of a catadioptric lens assembly for use in an optical scanning device imaging assembly.
Figure 3:
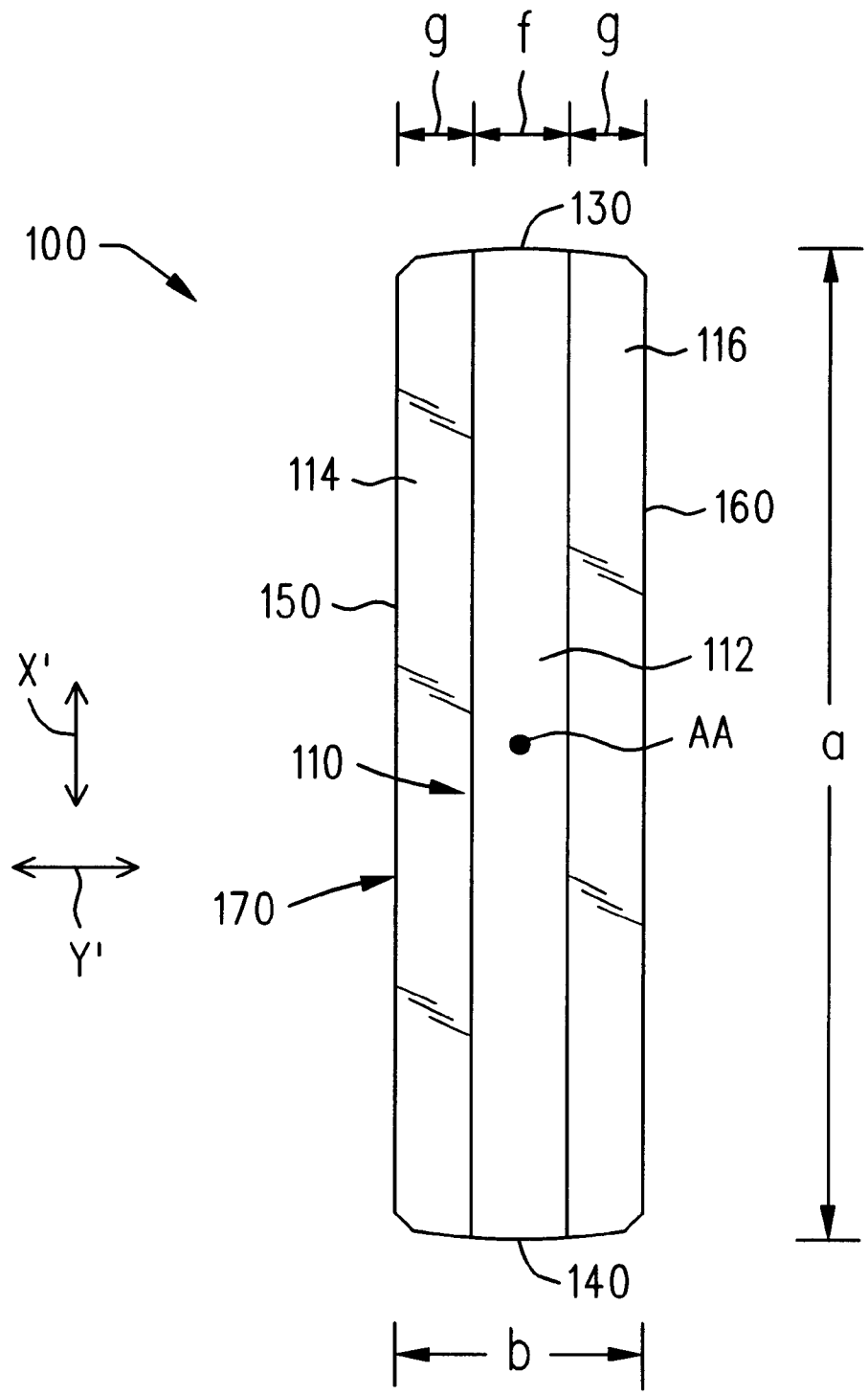
FIG. 3 is a front elevation view of the catadioptric tens assembly of FIG. 2.
Figure 4:
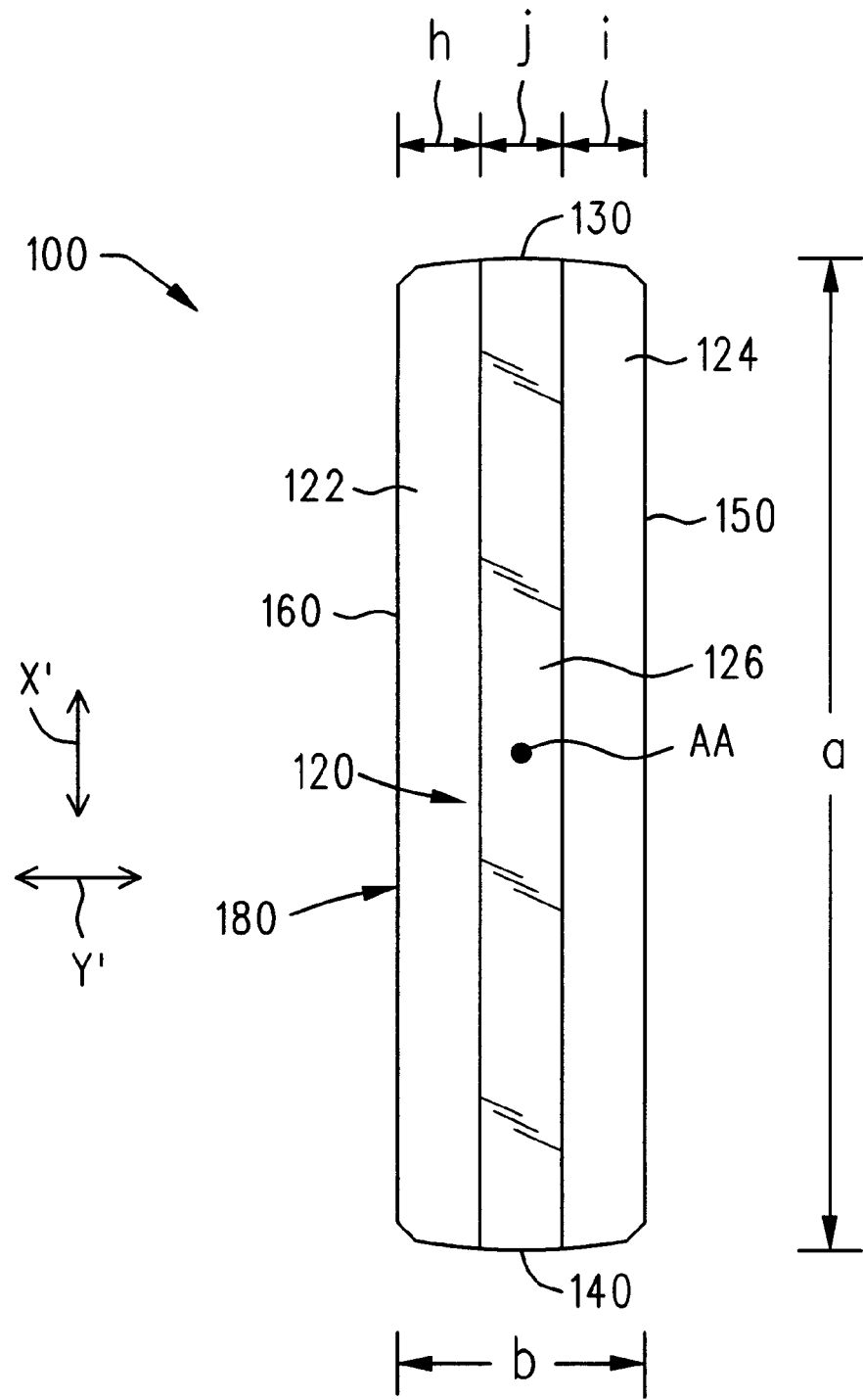
FIG. 4 is a rear elevation view of the catadioptric lens assembly of FIG. 2.

FIGS. 2–4 illustrate a catadioptric lens assembly 100 which allows a reduction of the physical envelope occupied by the image path portion 52 while maintaining its optical length as required for a given size reduction and lens focal length. To accomplish this reduction in the physical envelope, the catadioptric lens assembly 100 folds the image path portion 52 within the lens as shown, for example, in FIG. 5 and, thus, enables a more compact imaging assembly 10 and, accordingly, a more compact optical scanning device, as will be explained in further detail herein.

Referring to FIG. 2, the lens assembly 100 generally, may have a front surface 110, a rear surface 120, a first side surface 130 and a second side surface 140. As can best be seen in FIGS. 3 and 4, the lens assembly 100 may also include a first end surface 150 and a second end surface 160. The lens assembly 100 may have a height "a" of about 50.0 mm extending between the first side surface 130 and the second side surface 140, FIG. 2, and a width "b" of about 12.0 mm extending between the first end surface 150 and the second end surface 160, FIGS. 3 and 4.

Lens assembly 100 has a central longitudinal axis AA which bisects its length "a", FIGS. 2–4, and is, thus, equidistant from the first and second side surfaces 130, 140. Central longitudinal axis AA also bisects the width "b" of the lens assembly 100, FIGS. 3 and 4, and is, thus, also equidistant from the first and second end surfaces 150, 160. Referring to FIG. 2, lens assembly 100 has a depth "c" of about 16.3 mm extending between the front and rear surfaces 110, 120 measured at the central longitudinal axis AA.

Lens assembly 100 includes first and second lens members 170, 180. First lens member 170 includes the lens assembly front surface 110, previously described, and a first lens member second surface 172, FIG. 2. Lens assembly front surface 110 may be a spherical surface having a radius "r1" of about 48.0 mm and a center of curvature "c1" located on the lens assembly central longitudinal axis AA. First lens member second surface 172 may be a spherical surface having a radius "r2" of about 70.6 mm and a center of curvature "c2" located on the lens assembly central longitudinal axis AA at a distance "d" of about 11.3 mm from the center of curvature "c1" of the radius "r1" as shown.

Second lens member 180 includes the lens assembly rear surface 120, previously described, and a second lens member second surface 182, FIG. 2. Lens assembly rear surface 120 may be a spherical surface having a radius "r3" of about 44.8 mm and a center of curvature "c3" located on the lens assembly central longitudinal axis AA at a distance "e" of about 39.0 mm from the center of curvature "c1" of the radius r1 as shown. Second lens member second surface 182 may be a spherical surface identical to the first lens member first surface 172 and, thus, may have a radius "r2" of about 70.6 mm and a center of curvature "c2" located on the lens assembly central longitudinal axis AA at a distance "d" of about 11.3 mm from the center of curvature "c1" of the radius "r1".

First and second lens members 170, 180 may be attached to one another as shown in FIG. 2, with the first lens member second surface 172 being located directly adjacent the second lens member second surface 182 and an interface 102 being formed therebetween. First and second lens members 170, 180 may be attached in any conventional manner, such as by cementing.

First lens member 170 may be constructed of crown glass of the type commercially available from Schott Optical Glass, Inc. of Duryea, Pa. and sold as product specification Type BK 7. Second lens member 180 may be constructed of flint glass of the type commercially available from Schott Optical Glass, Inc. of Duryea, Pa. and sold as product specification Type F 4.

Referring to FIG. 3, the lens assembly front surface 110 is provided with a centrally located strip 112 of reflective material as shown. The strip 112 may have a width "f" of about 4.6 mm and may extend for the entire length "a" of the lens assembly 100. A pair of substantially transparent strips 114, 116 are located immediately adjacent and on either side of the strip 112. Transparent strips 114, 116 may each have a width "g" of about 3.7 mm and extend for the entire length "a" of the lens assembly 100. Reflective strip 112 may be formed by coating the lens assembly front surface 110, in the area described above, with a reflective material. The applied reflective material may have a minimum reflectivity of 90 percent at 580 nm, measured from the glass side, i.e., from the inside of the lens assembly 100. The reflective material may, for example, be a material such as silver.

After the reflective material is applied to the strip 112, as described above, the entire lens assembly front surface 110, including the strip 112, may be overcoated with an anti-reflective coating which may be a broad band anti-reflective coating. Alternatively, the anti-reflective coating may be chosen to more specifically reflect the wavelength of light produced by the scanning device light source. In a preferred embodiment, the scanning device light source may provide light having a wavelength of about 580 nm and the anti-reflective coating may be a ¼ wavelength thick (at 580 nm) layer of magnesium fluoride.

Referring to FIG. 4, the rear surface 120 of the lens assembly 100 is provided with a first 122 and a second 124 strip of reflective material as shown. First reflective strip 122 may extend from the lens assembly second end surface 160 for a distance "h" of about 4.0 mm and may have a length equal to the entire length "a" of the lens assembly 100. In a similar fashion, second reflective strip 124 may extend from the lens assembly first end surface 150 for a distance "i" of about 4.0 mm and may have a length equal to the entire length "a" of the lens assembly 100. A centrally located transparent strip 126 is located immediately adjacent and between the reflective strips 122 and 124. Transparent strip 126 may have a width "j" of about 4.0 mm and may extend for the entire length "a" of the lens assembly 100. The reflective strips 122, 124 may be formed by coating the lens assembly rear surface 120, in the areas described above, with a reflective material. The applied reflective material should have a minimum reflectivity of 90 percent at 580 nm, measured from the glass side, i.e., from the inside of the lens assembly 100. The reflective material may, for example, be a material such as silver.

In a similar manner to the lens assembly front surface 110 as described above, the entire lens assembly rear surface 120, including the strips 122 and 124, may be overcoated with an anti-reflective coating which may be a broad band anti-reflective coating. Alternatively, the anti-reflective coating may be chosen to more specifically reflect the wavelength of light produced by the scanning device light source. In a preferred embodiment, the scanning device light source may provide light having a wavelength of about 580 nm and the anti-reflective coating may be a ¼ wavelength thick (at 580 nm) layer of magnesium fluoride.

Figure 5:
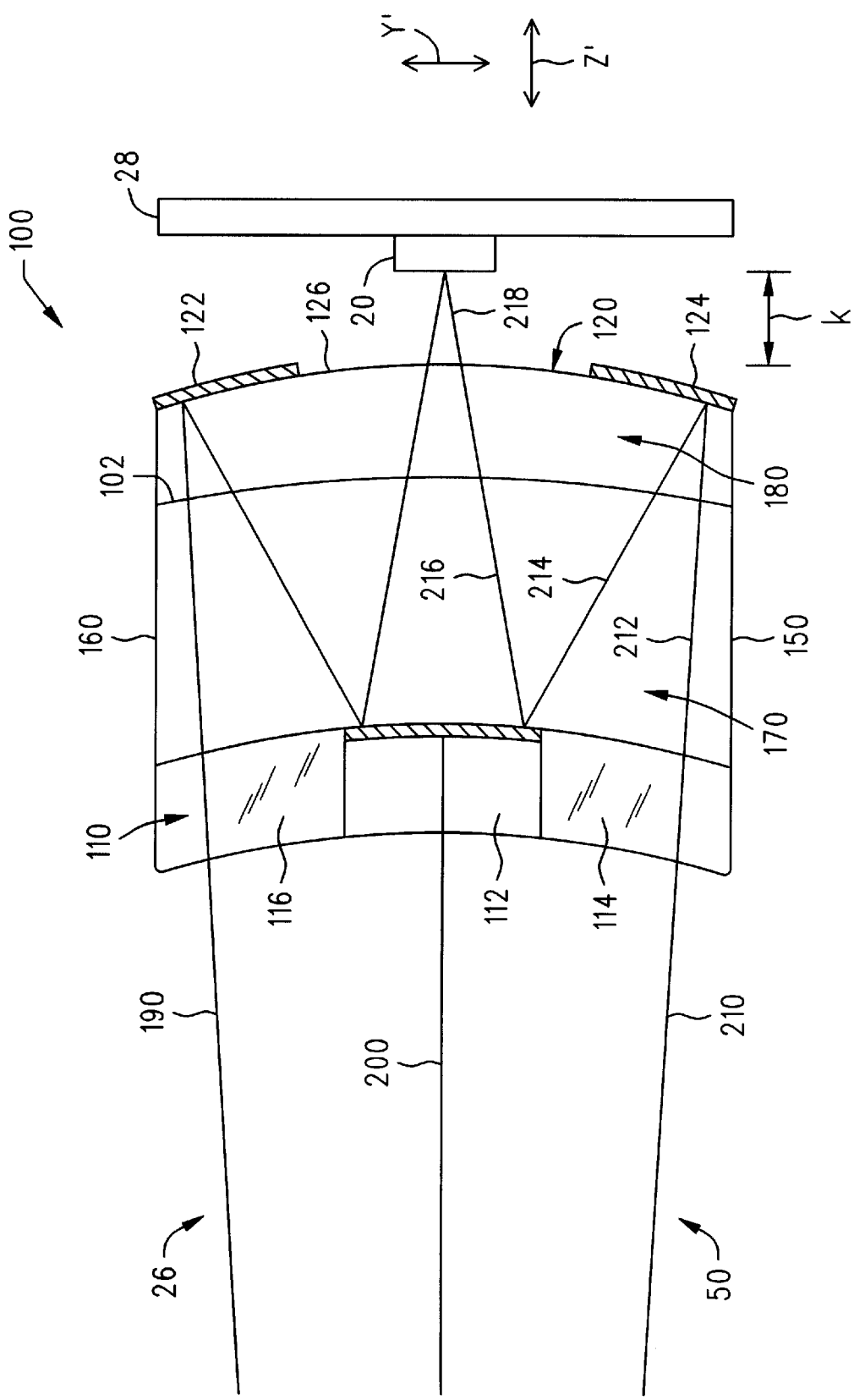
FIG. 5 is a cross-sectional view of the catadioptric lens assembly of FIG. 2 taken along the line 5—5 of FIG. 2.
Figure 7:
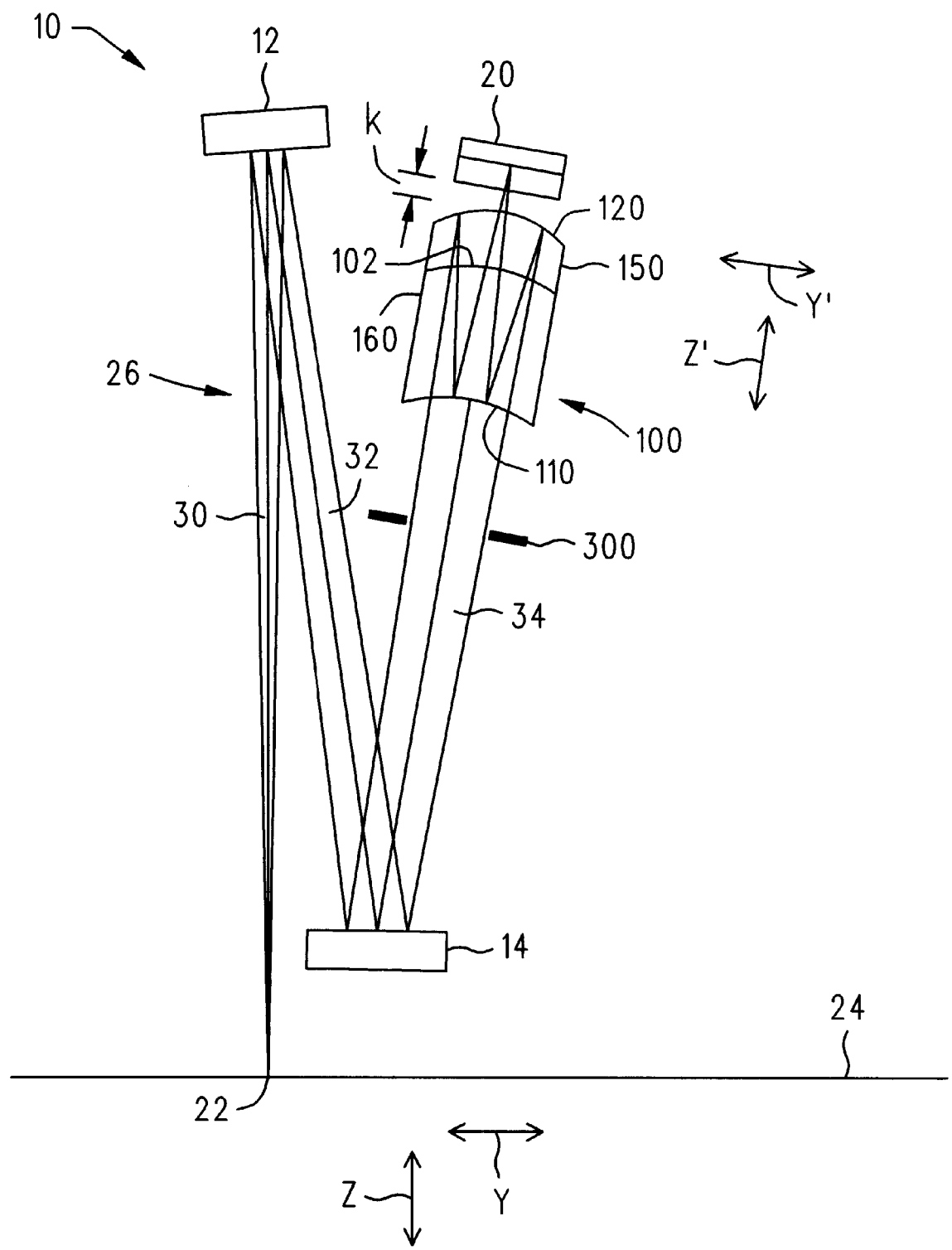
FIG. 7 is a schematic illustration of an optical scanning device imaging assembly including the catadioptric lens assembly of FIG. 2.

FIG. 5 is a cross-sectional view of the lens assembly 100 viewed from the direction of the x' axis, i.e., in a direction normal to the y'-z' plane. FIG. 5 schematically illustrates how the lens assembly 100 images light onto a photosensor array 20 when the lens assembly is mounted within the imaging assembly 10 of a scanning device in a manner as generally illustrated in FIG. 7. Photosensor array 20 may, in a conventional manner, be mounted on a printed circuit board substrate 28 as shown. Referring again to FIG. 5, light entering the lens 100 is schematically illustrated by three separate light beams 190, 200, 210. As can be seen, centrally located light beam 200 impinges upon the rear surface of the reflective strip 112 located on the front surface 110 of the lens 100 and is thereby blocked from entering the lens assembly 100. Light beam 190, however, passes above, as viewed in FIG. 5, the reflective strip 112 and, thus passes through the transparent strip 116 of the lens assembly front surface 110 and into the interior of the lens assembly 100. In a similar manner, light beam 210 passes below the reflective strip 112 and, thus passes through the transparent strip 114 of the lens assembly front surface 110 and into the interior of the lens assembly 100.

The operation of the lens assembly 100 will now be described in detail with respect to the light beam 210. As previously described, light beam 210 enters the lens assembly 100 through the lens assembly front surface transparent strip 114. After entering the lens assembly 100, the beam 210 passes through the interface 102 and is thereafter reflected a first time by the reflective strip 124 located on the lens assembly rear surface 120. The beam 210 then passes through the interface 102 a second time and is thereafter reflected a second time by the reflective strip 112 located on the lens assembly front surface 110. After this reflection, the beam 210 passes through the interface 102 a third time and subsequently passes through the transparent strip 126 located on the rear surface 120 of the lens assembly 100, thus exiting the lens assembly. After exiting the lens assembly, the light beam 210 impinges upon the photosensor array 20 in order to form an image of the object thereon in a manner as previously described.

Light beam 210 generally consists of an object path portion 50, as previously described with respect to the conventional lens arrangement of FIG. 1, and an image path portion. In contrast to the conventional lens arrangement of FIG. 1, however, the reflective strips 112, 122, 124 of the lens assembly 100, as illustrated in FIG. 5, cause the image path portion of the light beam 210 to be folded into three light path portions 212, 214, 216 within the lens assembly 100. Specifically, first light path portion 212 is located between the lens assembly front surface transparent strip 114 and the reflective strip 124. Second light path portion 214 is located between the reflective strip 124 and the reflective strip 112. The third light path portion 216 is located between the reflective strip 112 and the lens assembly rear surface transparent strip 126. After exiting the lens assembly 100 through the transparent strip 126, the image path portion of the light beam 210 continues through a short light path portion 218 until it impinges upon the photosensor array 20.

The lens assembly 100, thus, causes the majority of the imaging light beam image path portion to be folded internally within the lens assembly. Accordingly, the lens assembly 100 may be located at a close distance "k" from the photosensor array, FIG. 5, relative to the distance "m" that a conventional lens must be located from the photosensor array, as illustrated in FIG. 1. The distance "m", FIG. 1, which is substantially equal to the length of the light path portion 42, may be about 0.78 inches. In contrast, the distance "k" in FIG. 7 may, for example, only be about 0.12 inches in a typical configuration. The lens assembly 100, thus, provides for a more compact optical scanning device than is possible with a conventional lens assembly.

With reference again to FIG. 5, the image beam 26, in addition to being reflected, is also refracted within the lens assembly 100. Specifically, with reference to the light beam 210, the light beam is refracted a first time as it passes through the front surface transparent strip 114 of the lens assembly 100. It is refracted a second time as light path portion 212 passes through the interface 102, a third time as the light path portion 214 passes through the interface 102, a fourth time as the light path portion 216 passes through the interface 102 and a fifth time as the light beam 210 exits the lens assembly 100 through the rear surface 120.

This refraction aids in the reduction of various well-known optical aberrations such as spherical and chromatic aberration and, thus, enhances the quality of the image impinging upon the photosensor array 20. The index of refraction of the first and second lens members 170, 180, as previously discussed, as well as the shape of the interface 102 may be chosen specifically to correct for these aberrations in a conventional manner.

Figure 6:
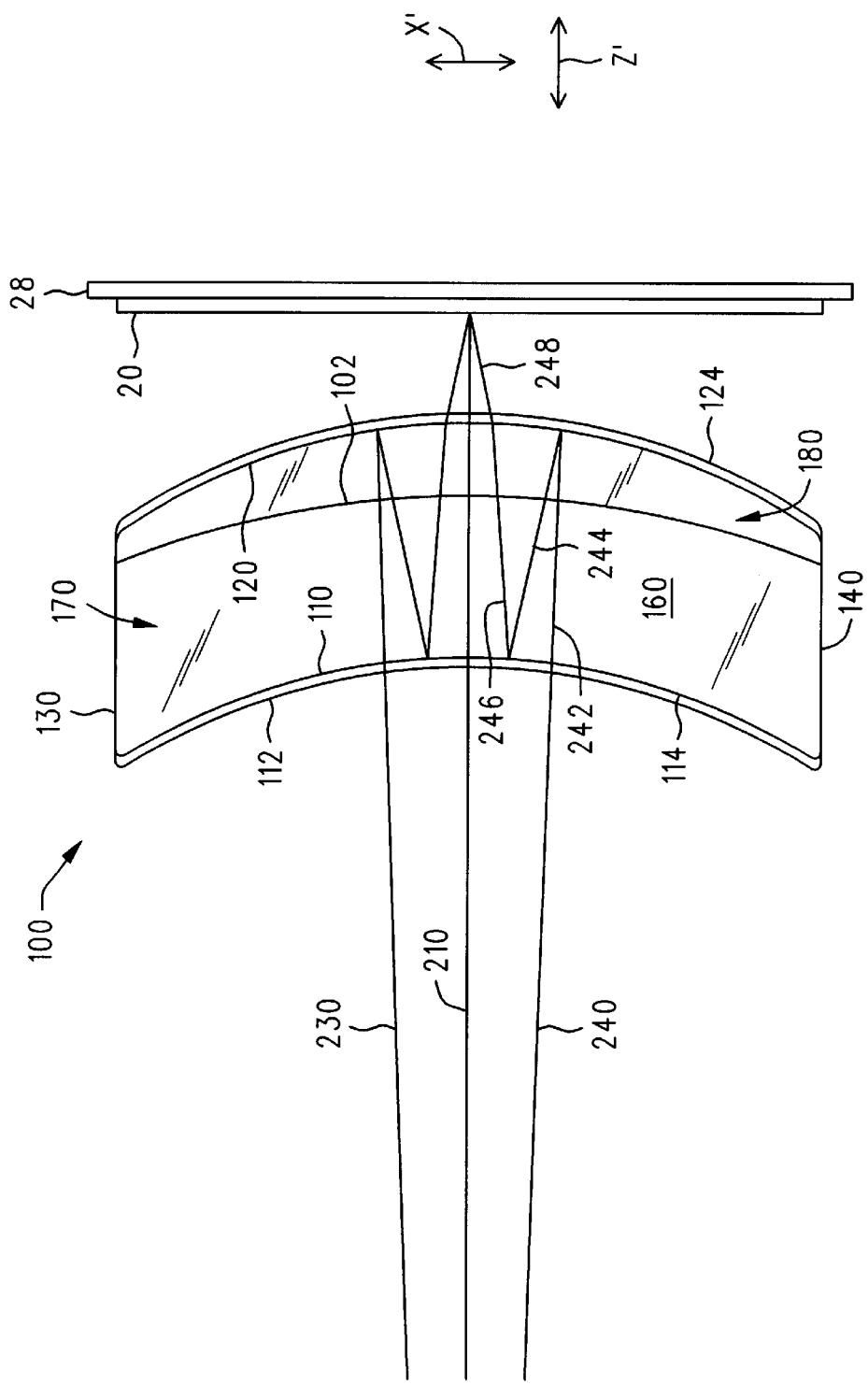
FIG. 6 is a side elevation view of the catadioptric lens assembly of FIG. 2 schematically illustrating the passage of light therethrough.

FIG. 6 illustrates the lens assembly 100 viewed from the direction of the y' axis, i.e., from a direction normal to the x'-y' plane. FIG. 6 schematically illustrates the light beam 210, as previously described with respect to FIG. 5, and two other light beams 230, 240 which are spaced from the light beam 210 in the x' direction. With reference, for example, to the light beam 240, the beam enters the lens assembly 100 through the lens assembly front surface transparent strip 114. The beam 240 then passes through the interface 102 and is thereafter reflected a first time by the reflective strip 124 located on the lens assembly rear surface 120. The beam 240 then passes through the interface 102 a second time and is thereafter reflected a second time by the reflective strip 112 located on the lens assembly front surface 110. After this reflection, the beam 240 passes through the interface 102 a third time and subsequently passes through the transparent strip 126 located on the rear surface 120 of the lens assembly 100, thus exiting the lens assembly. After exiting the lens assembly, the light beam 240 impinges upon the photosensor array 20 in order to form an image of the object thereon in a manner as previously described.

In a similar manner to the light beam 210 previously described, the light beam 240 is folded into three light path portions 242, 244, 246 within the lens assembly 100. Specifically, first light path portion 214 is located between the lens assembly front surface transparent strip 114 and the reflective strip 124. Second light path portion 244 is located between the reflective strip 124 and the reflective strip 112. The third light path portion 246 is located between the reflective strip 112 and the lens assembly rear surface transparent strip 126. After exiting the lens assembly 100 through the transparent strip 126, the image path portion of the light beam 240 continues through a short light path portion 248 until it impinges upon the photosensor array 20.

In a manner as described previously with respect to the light beam 210, the light beam 240, in addition to being reflected, is also refracted within the lens assembly 100. Specifically, the light beam 240 is refracted a first time as it passes through the front surface transparent strip 114 of the lens assembly 100. It is refracted a second time as light path portion 242 passes through the interface 102, a third time as the light path portion 244 passes through the interface 102, a fourth time as the light path portion 246 passes through the interface 102 and a fifth time as the light beam 240 exits the lens assembly 100 through the rear surface transparent strip 126.

It is noted that, although reflection and refraction of the image beam 26 have been described in detail only with respect to the y'-z' (FIG. 5) and x'-z' (FIG. 6) planes, it will be understood that similar reflection and refraction occur in all planes within the lens assembly 100 as will be readily apparent to one skilled in the art.

It is further noted that, in FIG. 5, the thickness of the reflective strips 112, 122 and 124 has been greatly exaggerated for purposes of illustration. Similarly, in FIG. 6, the thickness of the surfaces 112 and 124 have likewise been greatly exaggerated. The actual thickness of the strips 112, 122 and 124 may be only about 0.002 inches.

Referring to FIG. 7, it can be seen that the imaging assembly 10 incorporating the catadioptric lens assembly 100 is significantly more compact than the conventional imaging assembly illustrated in FIG. 1. Specifically, as previously described, the distance "k" between the catadioptric lens 100 and the photosensor array 20 is significantly less than the distance "m" between the conventional lens 18 and the photosensor array 20 in FIG. 1. Because of this reduced distance, the prism 16, FIG. 1, may be eliminated in the imaging assembly of FIG. 7.

An aperture stop 300 may be located as shown schematically in FIG. 7 in order to reduce or eliminate off-axis aberration in a conventional manner. Ideally, the aperture stop should be located as close as possible to the center of curvature of the lens surfaces 110 and 120. Accordingly, referring to FIG. 2, the aperture stop may preferably be located between the centers of curvature "C1" and "C3".

It is noted that, while the lens assembly 100 has been primarily described in conjunction with the optical system of a hand-held scanning device, the lens assembly may be used in any type of scanning device optical system where compactness is desirable.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. An optical assembly for a photoelectric imaging apparatus in which a light path extends between an object which is to be imaged and a photosensor array, said optical assembly comprising:
   said photosensor array;
   at least one optical component arranged along said light path;
   said at least one optical component including a lens;
   wherein said lens comprises a catadioptric lens; and
   wherein said lens comprises a substantially transparent lens member having a first concave surface and a second convex surface which is oppositely disposed relative to said first concave surface.

2. The optical assembly of claim 1 wherein said photosensor array is a linear photosensor array.

3. The optical assembly of claim 1 wherein said light path is folded within said lens.

4. The optical assembly of claim 1 and further including an aperture stop located along said light path.

5. The optical assembly of claim 1 wherein said lens further comprises:
   at least a first strip of reflective material located on at least a portion of said lens member first concave surface; and
   at least a second strip of reflective material located on at least a portion of said lens member second convex surface.

6. The optical assembly of claim 5 wherein said at least a second strip of reflective material comprises at least two second strips of reflective material located on said lens member second convex surface.

7. The optical assembly of claim 6 wherein said at least two second strips of reflective material are spaced from one another forming a non-reflective strip therebetween.

8. The optical assembly of claim 1 wherein said lens member comprises:

a first lens portion constructed of a crown glass material; and a second lens portion constructed of a flint glass material.

9. The optical assembly of claim 8 wherein said lens member first lens portion is immediately adjacent said lens member second lens portion, and an interface is formed between said first lens portion and said second lens portion.

10. The optical assembly of claim 9 wherein said first concave surface is located on said lens member first lens portion opposite said interface.

11. The optical assembly of claim 9 wherein said second convex surface is located on said lens member second lens portion opposite said interface.

12. A method of imaging a portion of an object which is to be imaged onto a photosensor array with a photoelectric imaging apparatus in which a light path extends between said portion of said object and said photosensor array, the method comprising:

providing an optical assembly including said photosensor array and at least one optical component arranged along said light path, said at least one optical component comprising a lens;

transmitting an imaging light beam from said portion of said object to said photosensor array along said light path via said at least one optical component;

reflecting said imaging light beam within said lens; and wherein said lens comprises a substantially transparent lens member having a first concave surface and a second convex surface which is oppositely disposed relative to said first concave surface.

13. The method of claim 12 wherein said lens comprises a catadioptric lens.

14. The method of claim 12 wherein said photosensor array is a linear photosensor array.

15. The method of claim 12 wherein said reflecting comprises folding said imaging light beam within said lens.

16. The optical assembly of claim 4 wherein:

said first concave surface having a first center of curvature; and said second convex surface having a second center of curvature; and said aperture stop is located between said first center of curvature and said second center of curvature.

17. The method of claim 12 wherein said lens further comprises:

at least a first strip of reflective material located on at least a portion of said lens member first concave surface; and at least a second strip of reflective material located on at least a portion of said lens member second convex surface.

18. The method of claim 17 wherein said reflecting comprises reflecting said imaging light beam off of said at least a first and said at least a second strip of reflective material.

19. The method of claim 17 wherein said at least a second strip of reflective material comprises at least two strips of reflective material.

20. The method of claim 19 wherein said at least two strips of reflective material are spaced from one another forming a non-reflective strip therebetween.

21. The method of claim 12 wherein said lens member comprises:

a first lens portion constructed of a crown glass material; and a second lens portion constructed of a flint glass material.

22. The method of claim 21 wherein said lens member first portion is immediately adjacent said lens member second portion and an interface is formed between said first portion and said second portion.

23. The method of claim 22 wherein said first concave surface is located on said lens member first portion opposite said interface.

24. The method of claim 22 wherein said second convex surface is located on said lens member second portion opposite said interface.

25. The method of claim 12 and wherein said transmitting an imaging light beam comprises transmitting said imaging light beam through an aperture stop.

26. The method of claim 25 wherein:

said first concave surface having a first center of curvature; and said second convex surface having a second center of curvature; and said aperture stop is located between said first center of curvature and said second center of curvature.

* * * * *